J. C. NICHOLS AND E. RYDER.
SHOCK ABSORBER.
APPLICATION FILED SEPT. 10, 1919.
1,334,390. Patented Mar. 23, 1920.
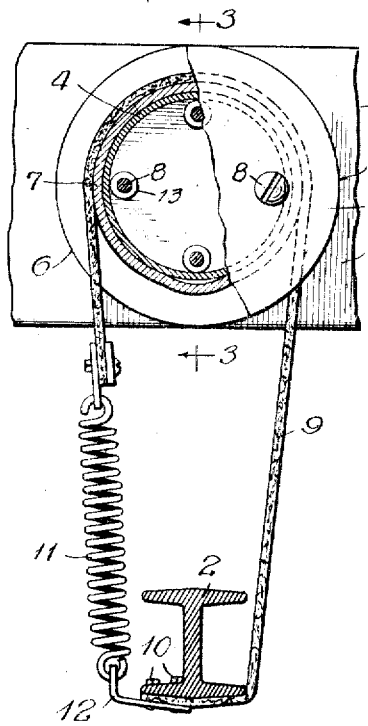
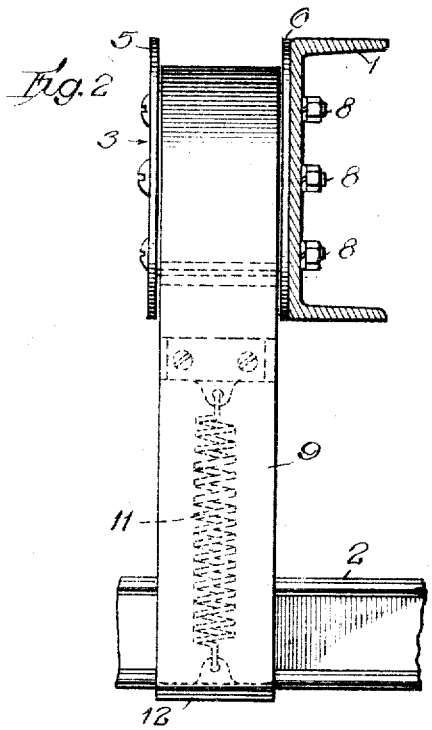
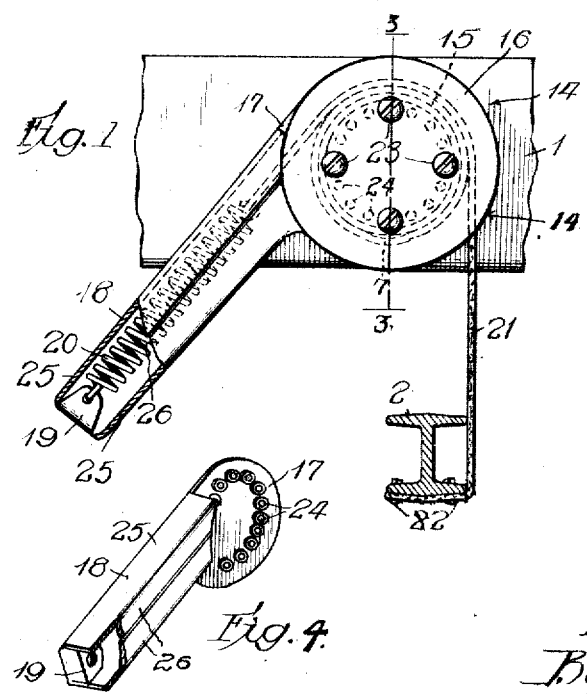
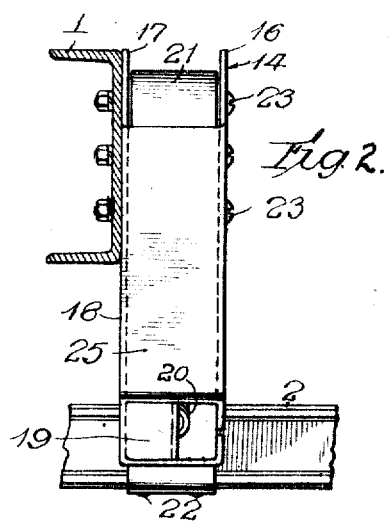
Inventors
James C. Nichols and
Elmer Ryder

UNITED STATES PATENT OFFICE.

JAMES C. NICHOLS AND ELMER RYDER, OF BERWYN, ILLINOIS.

SHOCK-ABSORBER.

1,334,390.  Specification of Letters Patent.  Patented Mar. 23, 1920.

Application filed September 10, 1919. Serial No. 322,860.

*To all whom it may concern:*

Be it known that we, JAMES C. NICHOLS and ELMER RYDER, citizens of the United States, both residing at Berwyn, in the county of Cook and State of Illinois, have invented new and useful Improvements in Shock-Absorbers, of which the following is a specification.

This invention relates to shock absorbers adapted for use on motor vehicles, such as automobiles, motor trucks, and the like, and consists of the matters hereinafter described and more particularly pointed out in the appended claims.

In the accompanying drawings:—

Figure 1 is a front view, with parts in section, of a shock absorber constructed in accordance with our invention;

Fig. 2 is a side view of the device;

Fig. 3 is a vertical sectional view taken on line 3—3 of Fig. 1; and

Fig. 4 is a perspective view of a detail of construction to be hereinafter described.

In the drawing, we have shown two members, 1 and 2, spaced apart vertically, and adapted to have relative movement one toward the other, and in an automobile construction, the member 1 would be one of the side members of the chassis or main frame of the vehicle, and the member 2, one of the axles thereof, said members having yieldable connection by a spring as usual. Interposed between said members 1 and 2 is a shock absorber of our invention, the same comprising a non-rotatable drum 14 having a cylindrical body portion 15 and circular end plates 16, 17, the latter having the same diameter but greater than that of the body portion, to provide an outwardly opening, annular channel to receive a band 7 made of friction material and having a width substantially equal to the distance between the end plates 16, 17. Said band 7 surrounds the cylindric body portion 15 and has a diameter slightly greater than the same, so that the band may slip circumferentially about said part when the occasion demands. The drum 14 is secured to the frame 1 on the outside thereof with one of its end plates against the same, the connection being made in any suitable manner, as by bolts 23, 23 inserted through holes 24 in said plates and registering holes in the frame 1.

Looped over the friction band 7 is a strap 21, made of canvas belting or any other desired material, and having a width substantially equal to that of the band 7 so that it will extend between the end plates 16, 17. The length of said strap is such that one of its ends reaches the axle 2 and is rigidly secured thereto, as by bolts 22.

To vary the extent to which the looped portion of the strap extends about the cylindric body of the drum 14 and thus vary the amount of frictional engagement between the parts, the inner plate 17 has an arm or extension 18, one edge of which is preferably tangential to the circular edge of the plate 17. The lower end of said arm is bent to provide an ear 19 to which is connected the lower end of a tension spring 20, the upper end of said spring being connected with the free end of the strap 21. As shown in Fig. 4, the inner end plate 17 is provided with a greater number of bolt holes 24 than the outer plate 16. Thus, to adjust the lower end of said extension 18 toward or from the axle 2 and thus increase or decrease the extent to which the strap is looped about the cylindric body 15, the bolts 23 are disengaged from the inner plate 17 and the latter turned, and when the extension 18 is positioned as required, the nearest bolt holes 24 in the end plate 17 are brought opposite the bolts and the latter passed through the side frame 1 to clamp the parts together. To house and protect the spring 20, the extension 18 may be provided with side and top flanges 25, 26.

The friction member or band 7 constitutes a friction surface for the strap where it engages the body portion of the drum. In the device as shown, the end plates 16, 17 are made separate from the body portion 15, and the metal about each bolt hole is pressed or forced inward to provide inwardly extending bosses 13 to guide the bolts and to support the body portion between the end plates, as shown in Fig. 3.

The device functions as follows. When the vehicle receives a shock in the travel over a roadway, the body of the car suddenly and rapidly moves downward toward the axle 2, carrying therewith the side member 1 and drum 14. As the latter moves downward away from the loop in the strap 21, the spring 20 contracts, taking up the slack suddenly provided in the strap and brings the looped portion of the strap down against the drum 14. In other words, the ends of the strap are brought closer together, and the stretch of the strap between its fixed end and looped portion, shortened. Manifestly, when the frame member 1 moves upward on the rebound, a quick return movement is resisted by the strap and retarded by the frictional engagement between the same and the drum 14 through the medium of the friction band 7. As the spring 20 expands, the ends of the strap gradually separate to lengthen the stretch of strap between the members 1 and 2, and the band 7 slips gradually on the body portion 4 of the drum to permit this to be done. Thus the upward movement of the car body is gradual and snubbed when the member 1 returns to its normal position and prevented from going above the same to lift the wheels from the roadway and multiply the initial shock many times. By allowing the band 7 to slip circumferentially about the body member 15, the band may change its position by its own action and thus present all portions thereof to wear.

We claim as our invention:

1. The combination with the spring supported frame of a vehicle and the axle, of a shock absorber, comprising a non-rotatable drum secured to said frame, a strap partially looped about said drum and having frictional engagement therewith and having one end rigidly secured to said axle, an arm connected with said frame at said drum by means permitting the outer end of said arm to be adjusted in the arc of a circle toward or from said axle, and a tension spring connecting the other end of said strap to the outer end of said arm.

2. The combination with the spring supported frame of a vehicle and the axle, of a shock absorber, comprising a non-rotatable drum secured to said frame, a strap partially looped about said drum and having one end rigidly secured to said axle, an arm connected with said frame at said drum by means permitting the outer end of said arm to be adjusted in the arc of a circle toward or from said axle, a tension spring connecting the other end of said strap to the outer end of said arm, and a friction band interposed between said strap and said drum.

3. The combination with the spring supported frame of a vehicle and the axle, of a shock absorber, comprising a non-rotatable drum secured to said frame, a strap partially looped about said drum and having one end rigidly secured to said axle, an arm connected with said frame at said drum by means permitting the outer end of said arm to be adjusted in the arc of a circle toward or from said axle, a tension spring connecting the other end of said strap to the outer end of said arm, and a continuous band of friction material surrounding said drum between the same and said strap and having a diameter slightly greater than said drum.

4. The combination with the spring supported frame of a vehicle and the axle, of a shock absorber, comprising a non-rotatable drum secured to said frame and having a cylindric body portion and end plates, a strap partially looped about said drum between said plates and having an end rigidly secured to said axle, an arm provided on one of said end plates and the latter being secured to said frame by means permitting said plate to be moved circumferentially to adjust the outer end of said arm in the arc of a circle toward or from said axle, and a tension spring connecting the other end of said strap with the outer end of said arm.

5. The combination with the spring supported frame of a vehicle and the axle, of a shock absorber, comprising a non-rotatable drum secured to said frame and having a cylindric body portion and end plates, a strap partially looped about said drum between said plates and having an end rigidly secured to said axle, an arm provided on one of said end plates and the latter being secured to said frame by means permitting said plate to be moved circumferentially to adjust the outer end of said arm in the arc of a circle toward or from said axle, a tension spring connecting the other end of said strap with the outer end of said arm, and a band of friction material interposed between said strap and said drum.

In testimony that we claim the foregoing as our invention, we affix our signatures this 2nd day of September A. D. 1919.

JAMES C. NICHOLS.
ELMER RYDER.